(12) United States Patent
Janos et al.

(10) Patent No.: US 12,555,135 B2
(45) Date of Patent: *Feb. 17, 2026

(54) AUTOMATED CAMPAIGN CONFIGURATION SWITCHING FRAMEWORK

(71) Applicant: SYSTEM1 OPCO, LLC, Venice Beach, CA (US)

(72) Inventors: Nathan R. Janos, Santa Monica, CA (US); Sanjeev M. Rao, Manhattan Beach, CA (US); John W. Meacham, III, Santa Monica, CA (US); Gyu-Ho Lee, Los Angeles, CA (US)

(73) Assignee: SYSTEM1, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/588,772

(22) Filed: Feb. 27, 2024

(65) Prior Publication Data

US 2025/0022007 A1    Jan. 16, 2025

Related U.S. Application Data

(63) Continuation of application No. 15/465,183, filed on Mar. 21, 2017, now Pat. No. 11,928,708, which is a continuation of application No. 14/880,028, filed on Oct. 9, 2015, now abandoned.

(51) Int. Cl.
*G06Q 30/00* (2023.01)
*G06Q 30/0242* (2023.01)

(52) U.S. Cl.
CPC ..... *G06Q 30/0243* (2013.01); *G06Q 30/0246* (2013.01)

(58) Field of Classification Search
None
See application file for complete search history.

(56) References Cited

U.S. PATENT DOCUMENTS

| | | | | |
|---|---|---|---|---|
| 7,814,038 B1* | 10/2010 | Repici | ..................... | G06N 3/092 706/25 |
| 9,038,043 B1* | 5/2015 | Fleetwood | ......... | G06Q 30/0246 717/151 |
| 2005/0234698 A1* | 10/2005 | Pinto | ...................... | G06Q 30/02 703/22 |
| 2007/0027771 A1* | 2/2007 | Collins | .............. | G06Q 30/0263 705/14.54 |
| 2009/0150215 A1* | 6/2009 | Kalb | ...................... | G06Q 30/02 705/7.29 |

(Continued)

OTHER PUBLICATIONS

Ghose; Modeling and analysis of air campaign resource allocation; IEEE; pp. 403-418; 2002.*

(Continued)

*Primary Examiner* — Radu Andrei
(74) *Attorney, Agent, or Firm* — Schwegman Lundberg & Woessner, P.A.

(57) ABSTRACT

Dynamic campaign optimization systems and methods may be used to continuously test many alternative campaign configurations while allowing all configurations, including configurations formerly identified as successful and unsuccessful, to be re-tested in order to identify successful configurations that may previously have been identified as unsuccessful.

21 Claims, 3 Drawing Sheets

(56) References Cited

U.S. PATENT DOCUMENTS

| | | | | |
|---|---|---|---|---|
| 2014/0019228 | A1* | 1/2014 | Aggarwal | G06Q 30/0244 705/14.43 |
| 2014/0324599 | A1* | 10/2014 | Munoz Torres | G06Q 30/0241 705/14.69 |
| 2016/0175719 | A1* | 6/2016 | Reillo | A63F 13/533 463/43 |
| 2016/0292722 | A1* | 10/2016 | Myers | G06Q 30/0243 |

OTHER PUBLICATIONS

Schirmeir; An Open and Versatile Fault-Injection Framework; IEEE, pp. 245-255; 2015.*
"U.S. Appl. No. 15/465,183, Appeal Brief filed Apr. 20, 2022", 18 pgs.
"U.S. Appl. No. 15/465,183, Appeal Decision mailed Nov. 2, 2023", 15 pgs.
"U.S. Appl. No. 15/465,183, Examiner's Answer to Appeal Brief mailed May 3, 2022", 11 pgs.
"U.S. Appl. No. 15/465,183, Final Office Action mailed Dec. 20, 2019", 20 pgs.
"U.S. Appl. No. 15/465,183, Non Final Office Action mailed Mar. 18, 2021", 20 pgs.
"U.S. Appl. No. 15/465,183, Non Final Office Action mailed Jun. 4, 2019", 14 pgs.
"U.S. Appl. No. 15/465,183, Notice of Allowance mailed Nov. 8, 2023", 8 pgs.
"U.S. Appl. No. 15/465,183, Preliminary Amendment filed Aug. 29, 2017", 8 pgs.
"U.S. Appl. No. 15/465,183, Reply Brief filed Jul. 5, 2022", 4 pgs.
"U.S. Appl. No. 15/465,183, Response Filed Jan. 22, 2021 to Final Office Action mailed Dec. 20, 2019", 13 pgs.
"U.S. Appl. No. 15/465,183, Response Filed Dec. 4, 2019 to Non Final Office Action mailed Jun. 4, 2019", 12 pgs.

* cited by examiner

AUTOMATED CAMPAIGN CONFIGURATION SWITCHING FRAMEWORK

PRIORITY APPLICATION

This application is a continuation of, and claims priority to U.S. application Ser. No. 15/465,183, filed Mar. 21, 2017, now issued as U.S. Pat. No. 11,928,708, which is a continuation of, and claims priority to U.S. application Ser. No. 14/880,028, filed Oct. 9, 2015, the disclosure of which is incorporated herein in its entirety by reference.

TECHNICAL FIELD

This application generally relates to online advertising systems and more particularly, but not by way of limitation, to systems and methods for testing advertising campaign configurations.

BACKGROUND

Advertisers frequently include hyperlinks in emails, web pages, banner advertisements, or other media to direct users to pages displaying further advertisement information. These pages are called "landing pages." A landing page can be designed to request that a browsing user do something, referred to as a "call to action." If a user performs the desired action, the call to action is successful, otherwise the call to action may not be successful. The percent of users who reach the landing page and go on to complete the desired call to action may be referred to as the success rate of the landing page.

The design and configuration of the landing page influences its success rate. Determining which of the nearly infinite number of possible landing page designs is best is the subject of much study.

One conventional method of testing landing page variants is a process known as A/B testing. An advertiser can design an experiment to determine empirically which of several landing page designs has the best conversion rate. An advertiser may design two different landing pages, conventionally called landing page A and landing page B. For example, the advertiser may want to compare an original landing page with a landing page with a different headline or a landing page with a different image. The advertiser may then conduct an experiment by running the same advertisement for both landing pages, so that some randomly selected group of visitors who select the advertisement see landing page A and others see landing page B. The advertiser then compares the conversion rates of the two landing pages to determine which is more effective. This technique of comparing whole web pages can be called an A/B comparison, an A/B test, or an A/B experiment. Performing an A/B test can require some statistical expertise on the part of the advertiser.

SUMMARY

In some aspects, the present disclosure provides a process for identifying and utilizing successful configurations from a collection of possible configurations in an internet based system. The process may include the steps of: receiving a plurality of user requests for a web content element from a plurality of users; identifying a plurality of configuration alternatives corresponding to the requested web content element, each configuration alternative having an associated weight; in response to each request, selecting one of the configuration alternatives based on the associated weights, configuring an alternative-configured impression of the requested web content element according to the selected configuration alternative, and presenting the alternative-configured impression of the web content element to each requesting user; calculating a success metric value for each configuration alternative based on subsequent requests from users to whom each corresponding alternative-configured impression is presented; updating the associated weight of each configuration alternative in proportion to the success metric for the each configuration alternative; selecting at least one boost-selected configuration alternative and increasing the associated weight value of the boost-selected configuration alternative by a random quantity.

In some aspects, the step of identifying a plurality of configuration alternatives corresponding to the requested web content element comprises identifying information describing a user and selecting a plurality of configuration alternatives based on the information describing the user.

In some aspects, the step of identifying information describing the user comprises identifying a user cohort of which the user is a member. In some aspects, the step of selecting at least one boost-selected configuration alternative comprises selecting at least one boost-selected configuration alternative with an associated weight value below a first threshold value.

In some aspects, the step of selecting at least one boost-selected configuration alternative comprises selecting at least one boost-selected configuration alternative with a number of impressions during a past period of time below a threshold number of impressions.

In some aspects, the step of selecting at least one boost-selected configuration alternative comprises selecting at least one boost-selected configuration alternative with a statistical confidence interval wider than a threshold confidence interval. In some aspects, the step of selecting at least one boost-selected configuration alternative comprises selecting at least one boost-selected configuration alternative with an associated success metric value below a threshold level.

In some aspects, the step of updating the associated weight of each configuration alternative comprises updating the associated weight of each configuration alternative in proportion to the success metric for the each configuration alternative.

In some aspects, the step of updating the associated weight of each configuration alternative comprises determining updated weight values based on at least one member of the group consisting of: statistical significance intervals of the success metric, a number of trials in which each configuration alternative has been tested, a total number of trials in which all configuration alternatives in a campaign have been tested, a frequency of configuration alternative testing trials, timing history of configuration alternative testing trials, dates configuration alternative test impressions, a geographical location of users viewing a tested configuration alternative.

In some aspects, the success metric comprises a member of the group consisting of: a conversion rate, click-through rate, a total revenue generated by a configuration alternative within a period of time, a total revenue generated from the configuration alternative presentation in a period of time divided by a total number of clicks on a particular target link on a configuration alternative presentation in the same period of time, a quantitative measure of web traffic, and a user relevance score.

Another aspect of the present disclosure provides a system for identifying and utilizing successful configurations from a collection of possible configurations in an internet based system. The system may include at least one processor and at least one data storage device with a plurality of storage sections. The system may also include a first storage section of the at least one data storage device having dispatcher process instructions stored therein, wherein the dispatcher process instructions, when executed by the at least one processor, configure the at least one processor to receive a plurality of user requests for a web content element from a plurality of user client devices and to communicate information associated with each user request to a dynamic campaign management selector process.

The system may further include a second storage section of the at least one data storage device having dynamic campaign management selector process instructions stored therein, wherein the dynamic campaign management selector process instructions, when executed by the at least one processor, configure the at least one processor to select a campaign configuration set from a campaign configuration data storage section of the at least one data storage device based on information accompanying each user request, the selected campaign configuration set comprising a plurality of configuration alternatives, each configuration alternative having an associated weight value. The dynamic campaign selector process instructions may further configure the at least one processor to communicate with a configuration alternative selector process.

The system may further include a third storage section of the at least one data storage device having configuration alternative selector process instructions stored therein, wherein the configuration alternative selector process instructions, when executed by the at least one processor, configure the at least one processor to select a configuration alternative based on the weight values for the configuration alternatives in the selected campaign configuration set and the information accompanying each user request. The configuration alternative selector process instructions may further configure the at least one processor to communicate with a campaign controller process.

The system may further include a fourth storage section of the at least one data storage device having campaign controller process instructions stored therein, wherein the campaign controller process instructions, when executed by the at least one processor, configure the at least one processor to monitor user requests received by the dispatcher process associated with each configuration alternative and to calculate at least one success metric for each configuration alternative based on the monitored user requests. the campaign controller process instructions may further configure the at least one processor to store success metrics in a success metric data storage region.

The system may further include a fifth storage section of the at least one data storage device having dynamic campaign management refresher process instructions stored therein, wherein the dynamic campaign management refresher process instructions, when executed by the at least one processor, configure the at least one processor to update the weight values associated with the configuration alternatives; and store the updated weight values in a configuration alternative weight data storage region of the at least one storage device.

In some aspects of the system, the dynamic campaign management refresher process instructions further configure the at least one processor to select one or more of the configuration alternatives for weight boosting, and to increase the weight value for each of the configuration alternatives selected for weight boosting.

In some aspects of the system, the dynamic campaign management refresher process instructions further configure the at least one processor to select one or more of the configuration alternatives for weight boosting by selecting at least one boost-selected configuration alternative with an associated weight value below a first threshold value.

In some aspects of the system, the dynamic campaign management refresher process instructions further configure the at least one processor to select one or more of the configuration alternatives for weight boosting by selecting at least one boost-selected configuration alternative with a number of impressions during a past period of time below a threshold number of impressions.

In some aspects of the system, the dynamic campaign management refresher process instructions further configure the at least one processor to select one or more of the configuration alternatives for weight boosting by selecting at least one boost-selected configuration alternative with a statistical confidence interval wider than a threshold confidence interval.

In some aspects of the system, the dynamic campaign management refresher process instructions further configure the at least one processor to select one or more of the configuration alternatives for weight boosting by selecting at least one boost-selected configuration alternative with an associated success metric value below a threshold level.

In some aspects of the system, the dispatcher process instructions further configure the at least one processor to identify a plurality of configuration alternatives corresponding to the requested web content element by identifying information describing a user and selecting a plurality of configuration alternatives based on the information describing the user. In some aspects of the system, identifying information describing the user comprises identifying a user cohort of which the user is a member.

In some aspects of the system, the dynamic campaign management refresher process instructions further configure the at least one processor to update the weight values associated with the configuration alternatives by updating the associated weight of each configuration alternative in proportion to the success metric for the each configuration alternative.

In some aspects of the system, the dynamic campaign management refresher process instructions further configure the at least one processor to update the weight values associated with the configuration alternatives by determining updated weight values based on at least one member of the group consisting of: statistical significance intervals of the success metric, a number of trials in which each configuration alternative has been tested, a total number of trials in which all configuration alternatives in a campaign have been tested, a frequency of configuration alternative testing trials, timing history of configuration alternative testing trials, dates configuration alternative test impressions, a geographical location of users viewing a tested configuration alternative.

In some aspects of the system, the success metric comprises a member of the group consisting of: a conversion rate, click-through rate, a total revenue generated by a configuration alternative within a period of time, a total revenue generated from the configuration alternative presentation in a period of time divided by a total number of clicks on a particular target link on a configuration alternative presentation in the same period of time, a quantitative measure of web traffic, and a user relevance score.

Another aspect of the present disclosure provides an internet-based system for identifying and utilizing successful configurations from a collection of possible configurations, the system comprising at least one processor and at least one data storage device with instructions executable by the at least one processor to establish and operate a plurality of process modules. The process modules may include a dispatcher module configured to receive a plurality of user requests for a web content element from a plurality of user client devices and to communicate information associated with each user request to a dynamic campaign management selector module.

The process modules may further include the dynamic campaign management selector module configured to select a campaign configuration set from a campaign configuration data store based on information accompanying each user request, the selected campaign configuration set comprising a plurality of configuration alternatives, each configuration alternative having an associated weight value, the dynamic campaign management selector module being in communication with a configuration alternative selector module;

The configuration alternative selector module may be configured to select a configuration alternative based on the weight values for the configuration alternatives in the selected campaign configuration set and the information accompanying each user request, the configuration alternative selector module configured to communicate with a campaign controller module;

The campaign controller module may be configured to monitor user requests associated with each configuration alternative and to calculate at least one success metric for each configuration alternative based on the monitored user requests, the campaign controller module configured to store success metrics in a success metric data store. The process modules may further include a dynamic campaign management refresher module configured to update the weight values associated with the configuration alternatives.

Neither the preceding summary, nor the following detailed description, nor the associated drawings limit or define the scope of protection. The scope of protection is defined by the claims.

BRIEF DESCRIPTION OF THE DRAWINGS

Certain novel features are set forth with particularity in the claims that follow. A further understanding of some of the features and advantages of some embodiments will be obtained by reference to the following detailed description that sets forth illustrative embodiments, in which certain non-limiting principles are utilized, and the accompanying drawings of which:

DETAILED DESCRIPTION

Figure 1:
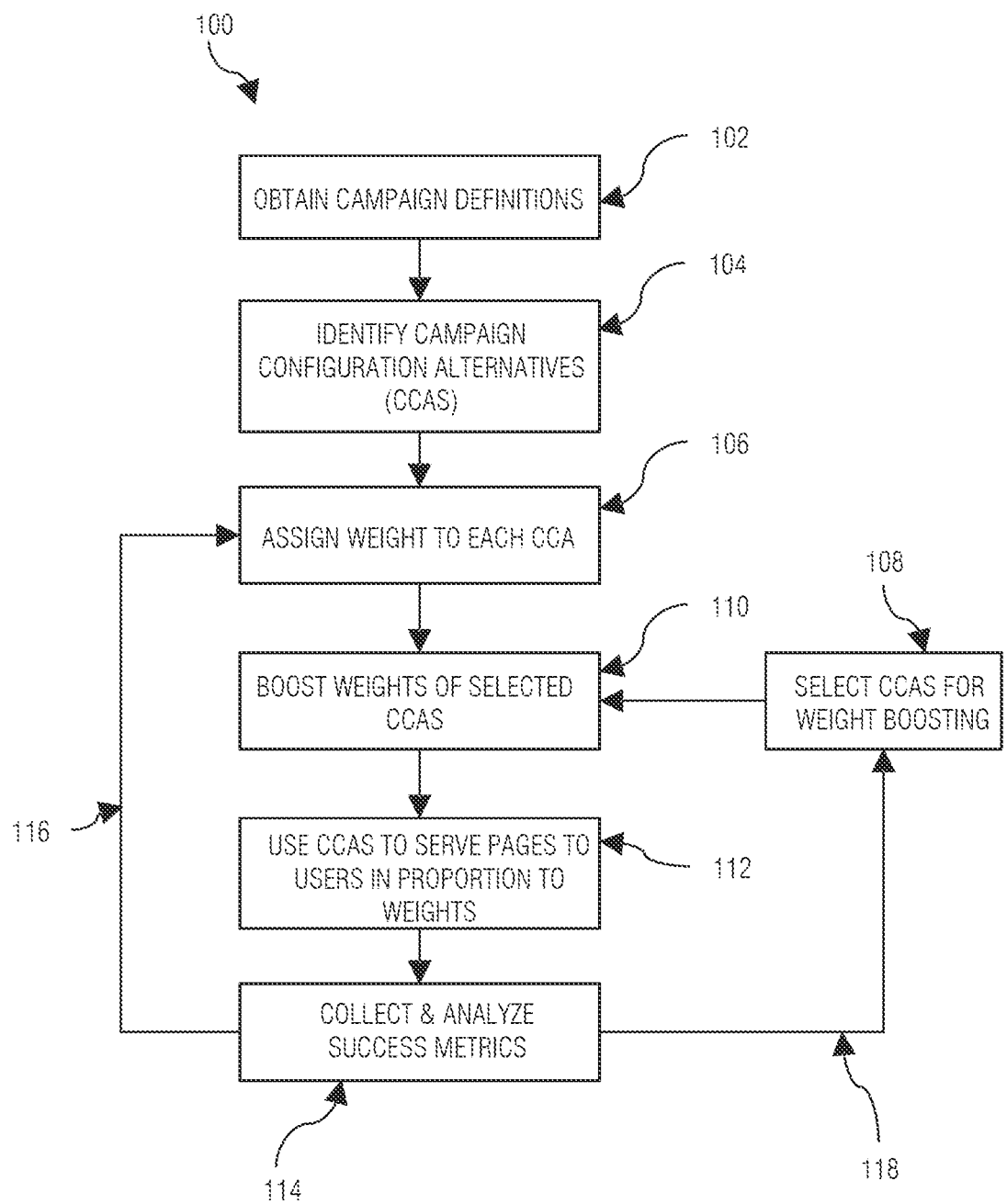
FIG. 1 is a process flow diagram illustrating an example process for dynamically testing campaign configuration alternatives.

The various embodiments will be described in detail with reference to the accompanying drawings. References made to particular examples and implementations are for illustrative purposes, and are not intended to limit the scope of the invention or the claims. Various features of the different disclosed embodiments can be combined to form further embodiments, which are part of this disclosure.

Advertisers frequently include hyperlinks in emails, web pages, banner advertisements, or other media to direct users to pages displaying further advertisement information. These pages are typically called "landing pages." A landing page can be designed to request that a browsing user do something, referred to as a "call to action." If a user performs the desired action, the call to action is successful, otherwise the call to action may not be successful. The percent of users who reach the landing page and go on to complete the desired call to action may be referred to as the success rate of the landing page.

The design and configuration of the landing page influences its success rate. Configuration of a landing page may include any variables affecting how the page appears or how it operates. Low success rates can result from landing pages that do not conform to the unpredictable and varying preferences of browsing users, or other sub-optimal configurations of variables. Identifying the best landing page configuration variant out of the nearly infinite number of possible configuration variants is a challenge.

The most common conventional method for evaluating landing page variants is known as "A/B testing," which is a method of testing alternative landing page configurations in pairs with the ultimate goal of identifying the "best" configuration to use for the duration of an ad campaign.

However, the inventors have recognized a problem with conventional methods of testing various landing page configurations. In particular, most conventional landing page testing methods assume that the one landing page configuration that "wins" a test will remain the best choice for the duration of the campaign. However, the inventors have recognized that the optimal landing page configuration may actually change over time as user preferences and other factors affecting the "success" of the landing page configuration shift. In addition, the inventors recognized that even the worst-performing configurations may perform well within a narrow user cohort, or at a later time, and therefore should not be permanently discarded.

Therefore, some embodiments disclosed herein provide dynamic campaign optimization systems and methods in which many alternative configurations may be continuously tested while allowing configurations formerly identified as "losers" to be re-tested in order to identify valuable configurations that may previously have been identified as low-value.

As used herein, the term "campaign" may refer to a collection of advertising subject matter, information, and actions that may be managed for a common objective. A campaign may be managed for a particular client, for a particular product, for a particular target audience, or various combinations of these and other factors.

As used herein, the term "campaign definition" may refer to information and/or data identifying factors such as a client, a product, a class or category of products, a target audience, content for one or more advertisements, information describing an appearance and/or a function of one or more landing page configurations, or other factors.

A campaign may be further defined by one or more campaign configuration sets which may contain data or information defining one or more campaign configuration alternatives (CCAs). In various embodiments, a "campaign configuration set" may comprise a single file, a collection of files, a collection of records in a database, a collection of records in multiple databases, or any other data storage format as desired.

Each CCA in a campaign configuration set may identify values for a plurality of campaign configuration variables (CCVs) that may determine how an impression of a test page is to be configured, operated, and/or presented to a user. Thus, each CCA may effectively be a variation of a campaign configuration to be tested by presentation to users.

Each CCA may define one or more values for each of one or more CCV parameters. In various embodiments, each CCA may have zero, one, two, or more values for each of a wide range of available CCV parameters.

Table 1 below illustrates some example campaign configuration variable (CCV) values for a few campaign configuration alternatives (CCA) in a campaign focused on advertisements for loan products. These examples are merely provided for illustration and are not meant to limit the scope of the invention.

TABLE 1

Example CCV values for various CCAs in a campaign.

| Variables | CCA #1 | CCA #2 | CCA #3 |
| --- | --- | --- | --- |
| displayed keywords | Loan, Mortgage | Loan, Instant Approval, Auto Loan | Cash Advance, Personal Loan, Bad Credit |
| invisible keywords | Interest Rate, Pre-Approval | Bad credit, no credit, payday | [null] |
| color scheme | Pastels | Red, White, & Blue | Primary Colors |
| ad network | Bing, Google | Yahoo | [null] |
| text location | Left | centered | left |
| images | [null] | img2.jpg | img3.jpg |
| layout | Layout #1 | Layout #1 | Layout #2 |

As shown in table 1, each of CCAs #1, #2 and #3 may have the same, different, or no (e.g., null or blank) values for each of the listed CCVs. In the example, each of the three CCAs may have a plurality of displayed keywords, and two of the CCAs may have some invisible (or non-displayed) keywords that may be passed to an ad network with a request for advertisements. The example CCAs may also include various options for color schemes, text locations, images, and layout options which may be defined in any way desired for a particular campaign. In the Table 1 example, two of the CCAs may specify one or more ad networks, while CCA #3 does not include a specific ad network.

In some embodiments, a null value or the lack of a specified value for a particular CCV may mean that all available values for that CCV may be used. For example, CCA #3 may use all ad networks available to the campaign. On the other hand, in some embodiments a null value for a particular CCV may indicate that the feature or element of the particular CCV may be omitted from the CCA impression. For example, in the Table 1 example, CCA #3 may be used without an ad network, and an alternate mechanism for selecting ads to be displayed may be used.

The process flow diagram of FIG. 1 illustrates logical flows of activities performed in an example process 100 for continuously testing various campaign configurations. Each of the blocks of FIG. 1 may represent one or more sub-processes that may contain additional steps. In some implementations, sub-processes represented by one or more of the blocks of FIG. 1 may be omitted or combined with another illustrated or un-illustrated sub-process.

In some embodiments, a computer-implemented campaign testing process 100 may begin by obtaining campaign definitions at block 102. Campaign configuration alternatives (hereinafter "CCAs") may be identified at block 104, weighting factors may be assigned to each one of the CCAs at block 106. In some embodiments, one or more CCAs may be selected at block 108 to have a weighting factor boosted (increased) at block 110, as will be further described below.

At block 112, the process 100 may serve landing pages or other content configured according to the CCAs. As described in further detail below, landing pages or other content configured according to each CCA may be served to a number of users proportional to or otherwise based on the weighting factors assigned in block 110. Weighting factors (otherwise referred to as "weights") may be coefficients or other numerical values used to influence the frequency with which a CCA is displayed to users. For example, in some cases, weights for all CCAs in a campaign may be numbers on a scale from 0 to 1. The total number of users to whom each CCA is presented may be proportional to the weighting factor for that CCA.

The results of users' interactions with the pages based on the CCAs may then be tracked at block 114. As further described below, the "success" of a page configuration based on a particular CCA may be evaluated in a number of ways. Regardless of the method of evaluating CCA success, the collected success metrics may be analyzed and communicated via line 116 to the sub-process in block 106 which may use past success metrics to adjust or assign CCA weighting factors. The success metrics collected and analyzed at block 114 may also be communicated via line 118 to the sub-process at block 108 which may use past success metric information to select one or more CCAs for weight boosting.

As further described below, CCAs with certain characteristics may be selected for weight boosting in order to increase the chance of finding unexpectedly successful CCAs from among the CCAs with historically poor success.

As described in further detail below, analyzing success metrics of tested CCAs may include analyses to detect CCAs that may be significantly more successful within an identifiable user cohort than within the overall population of users.

In some embodiments, such cohort-successful CCAs may form a basis for creation of new CCAs or entire new campaigns. In some embodiments, information may be extracted from one or more CCAs that prove successful within one or more cohorts in order to improve performance of future campaigns or CCAs selected for the same or similar cohorts. For example, multiple CCAs that are successful with a single cohort also contain a common CCV value, then that CCV value may be used at a higher rate (e.g., added to new or existing CCAs that are weighted more highly) in future campaigns directed to the same cohort. Similarly, if multiple CCAs successful with a single cohort contain combinations of two or more CCV values, those combinations of CCV values may be used at a higher rate (e.g., added to new or existing CCAs that are weighted more highly) for that particular cohort in future campaigns.

Figure 2:
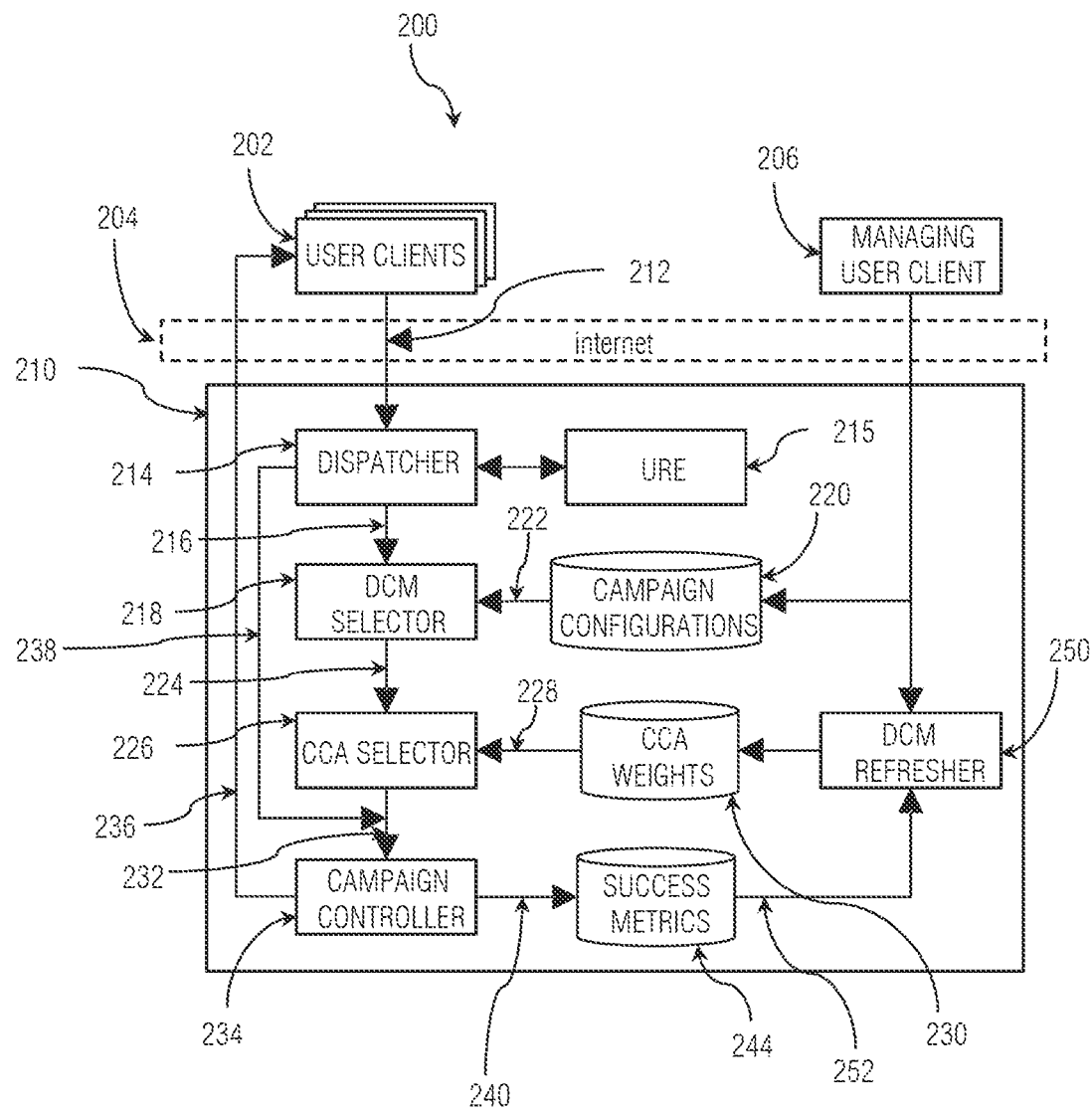
FIG. 2 is a block diagram illustrating an example of data flows between components of a system configured for performing a dynamic campaign configuration testing process.

The block diagram of FIG. 2 illustrates an example of data flows between components of a system 200 configured for performing a dynamic campaign configuration testing process such as the process 100 illustrated in FIG. 1. Each of the rectangular blocks of FIG. 2 may represent a device, a module, or a collection of processes working together to perform a particular task, and each of the cylindrical blocks of FIG. 2 may represent one or more data stores containing particular information. The illustrated modules and data stores may be separated or variously combined and/or re-configured as needed. The illustrated blocks and data stores may be implemented in any number of physical or virtual servers and may use any suitable tools, programming languages, database management systems, or other components as desired for a particular implementation.

The system 200 of FIG. 2 may generally be configured to allow web users operating client devices 202 to interact with a dynamic campaign management (DCM) system 210 via the internet 204 or other suitably configured computer network. In some embodiments, various components of the DCM system 210 may communicate with one another via the internet or any other computer network. In some embodiments, a managing user operating a client device 206 may also interact with the DCM system 210 via the internet (or other network). Alternatively, the managing user's client device 206 may operate from within the DCM system 210.

In one example, when a user clicks on a hyperlink leading to an advertisement managed by the DCM system 210, that user's client device 202 may send a request 212 for a web page (or other web content element) via the internet 204 to the DCM system 210. The requested web content element may include any web page or combination of internet-delivered elements such as media elements, images, videos, text documents, tracking pixels, client-executed scripts, etc. The request 212 may be initially received in the DCM system 210 by a dispatcher module 214 (also referred to herein as the "dispatcher" or the "dispatcher process"). The dispatcher may attempt to recognize the user or the user's client device (e.g., with a user recognition engine) in order to determine demographic, psychographic, geographic, or other information about the requesting user. The dispatcher 214 may also determine information about the requested page, content, or other information contained in the request.

Based on the detected user information (if any) and/or the information about the request itself, the dispatcher 214 may pass information 216 to a DCM selector module 218 (also referred to herein as the "DCM selector" or the "DCM selector process", the "dynamic campaign management selector process" or the "dynamic campaign management selector module"). Based on the information 216, the DCM selector module 218 may retrieve one or more sets of campaign configuration data 222 from the campaign configuration data store 220. Campaign configuration data 222 may include identification of one or more campaigns and one or more campaign configuration sets which may be associated with a plurality of campaign configuration alternatives (CCAs). The content of campaigns and campaign configuration sets may be managed, viewed and adjusted by a managing user via the managing user's client device 206.

The DCM selector 218 may then pass information 224 about the request, the requesting user, and the selected campaign configuration data 222 to a CCA selector module 226 (also referred to herein simply as the "CCA selector", the "CCA selector process", the "campaign alternative selector process", or the "campaign alternative selector module"). Based on the received information 224, the CCA selector 226 may retrieve CCA weights from a CCA weight data store 230. Based on the received information 224 and the retrieved CCA weights 228, the CCA selector 226 may select one of the CCAs associated with the campaign configuration data 222 for presentation to the user.

Having selected a CCA for presentation to the user, the CCA selector 226 may then pass information 232 identifying the selected CCA, the user, and the user's request to a campaign controller module 234 (also referred to herein as the "campaign controller" or the "campaign controller process"). The campaign controller 234 may then reply to the user's request via link 236 by serving a web page conforming to the specifications of the CCA along with one or more tracking pixels or any other tracking mechanism configured to track subsequent requests associated with the selected CCA from the same user. Any subsequent requests from the same user associated with the same CCA may then be passed directly from the dispatcher 214 to the campaign controller 234 via link 238.

The results 240 of CCA tests tracked by the campaign controller 234 may be stored in a success metric data store 244. In some embodiments, a success metric may generally include a combination of factors such as revenue, cost, and user interactions. Further examples of success metrics will be described in further detail below.

The DCM system 210 may also include a DCM refresher module 250 (also referred to herein as the "DCM refresher" or the "DCM refresher process") which may be configured to retrieve success metric data 252 from the success metric data store 244 in order to calculate and update CCA weights in the CCA weight data store 230. The DCM refresher 250 may also calculate and adjust or update CCA weights based on other factors or information.

Campaign Configurations

As discussed above, a campaign definition may include information and/or data identifying factors such as a client, a product, a target audience, content for one or more advertisements, information describing an appearance and/or a function of one or more web pages, or other factors. In some cases, a campaign definition may also include one or more campaign configuration sets, each of which may include information or data identifying a plurality of CCAs to be tested with users.

In some embodiments, each CCA in a campaign configuration set may identify values for a plurality of campaign configuration variables (CCVs) that may determine how an impression of a web page or other content is to be configured, presented to a user, or function. Thus, each CCA may effectively be a variation of a web page or other content to be tested by presentation to users. Alternatively or in addition, each CCA may identify values for other variables that may affect an outcome as measured by a success metric.

Campaign configuration variables (CCVs) may generally include any variables defining an appearance or visual presentation of one or more web pages, presentations, or other content according to a CCA. Some example CCVs may include page layouts (i.e., the physical location of text and graphic elements on a page), style (e.g., variations in colors, fonts, text formatting or other factors definable in a page style sheet), graphics (e.g., various images, possibly relating to a common theme or concept, that may be presented as part of a CCA impression).

Other CCVs may include factors related to an advertiser's presentation, such as keywords or key phrases to be presented to users (e.g., variations in the actual words presented to users, such as various phrasings of a particular offering or concept), a number of keywords or key phrases to be displayed to a user and/or to be requested from an advertising network, or a sequence or ordering of keywords or key phrases to be presented to a user.

In some embodiments, a user may click a particular key word, key phrase, graphic element, or other content element, and the page may send a request to an advertising network containing the clicked keyword or key phrase. In some embodiments, the request to an advertising network may also include one or more keywords or key phrases that were not displayed to the user, but that may be used to retrieve advertisements that may be relevant to the user based on the user's activity. These may be referred to as un-displayed or invisible keywords. The advertising network may then reply with a page displaying advertisements relating to the clicked key word or key phrase. The advertising network may also pay a fee to the operator of the campaign configuration system in exchange for the user impression.

Similarly, CCVs may include other variables affecting a request sent to an advertising network. For example, CCVs may include an identity of an advertising network to which a request will be sent, a type of advertisement offer or payment structure to be requested (e.g., cost-per-click, cost-per-action, cost-per-thousand-impressions, cost-per-lead, cost-per-sale, etc.)

In various embodiments, CCV values for each CCA may be defined manually, such as by a managing user via a managing user client device 206. In some embodiments, CCV values for each CCA may be determined automatically, such as by an automated management process.

In some embodiments, CCAs may be at least partially defined by an automated management process configured to iterate over all possible combinations of CCV values. The CCAs created by such an automated process may then be manually refined, tuned, or filtered.

In some embodiments, the total number of possible CCV combinations may be too large to reasonably test all of them in separate CCAs. Therefore, in such cases, the total universe of possible CCV combinations may be divided into groups based on similarities in the CCV combinations. For each group, one or more representative CCAs may be selected to represent the group of CCV combinations. In various embodiments, representative CCAs may be identified by any suitable manual or statistical process. In some embodiments, if a representative CCA is highly successful, then additional CCAs from the same group may be added to a configuration for future testing.

The campaign configuration data store 220 may contain one or more campaign configuration sets corresponding to each campaign. Each campaign configuration set may contain definitions of a plurality of CCAs, each with specified values for each of a plurality of CCVs, and each CCA being associated with a weighting factor. Each CCA may also be associated with one or more success metrics which may be calculated or otherwise determined based on any results of past testing of the CCA. Any other data as needed may also be associated with one or more CCAs and stored in the campaign configuration data store.

CCA Weighting

If a particular CCA has not been tested previously, then the CCA may be assigned an initial seed value as a weighting factor. Seed values may be applied according to any suitable algorithm. For example, a CCA may be new if it contains a combination of CCV values that have not previously been tested together, if it contains a CCV value that has not previously been tested in any CCAs, or a new CCV parameter that has not previously been tested in any CCAs. In some cases, a new CCA may be given an initial weight based on a desired proportion of traffic to which the CCA is to be shown. In some cases, the desired proportion of traffic for initial testing may be selected based on a desired sample size for the initial test.

If a particular CCA has been tested previously, then a weighting factor may be allocated to the CCA based on a success metric representing the outcome of the previous testing (example success metrics are described below). In some embodiments, the weight for each CCA may simply be proportional to the success metric for that CCA. For example, in some embodiments weights may be calculated by calculating a percent of total campaign revenue attributed to each CCA, and then normalizing the weighting factors to a scale such as 0 to 1, 1 to 10, or 1 to 100 (or any other scale).

In some embodiments, the weight for each CCA may be set based on additional factors or combinations of factors including statistical significance intervals of one or more success metrics, a number of trials in which a CCA has been tested, a total number of trials in which all CCAs in a campaign have been tested, frequency of trials, timing history of trials, dates and/or time of day of CCA test impressions, a geographical location of a user viewing a tested CCA, or other factors. For example, a CCA that has historically performed better for a certain user cohort, or at a certain time of year, or proximate to a particular event or holiday may be given a higher weight during dates or times or presentations for which that CCA has historically performed well. Similarly, a CCA that may be expected to perform better at specific times or when presented to a specific user cohort may be given a greater weight during those times or when presented to that specific user cohort. In some embodiments, a trial may be all CCA impressions that occur within a particular time period, such as a 24 hour time period.

Some examples of algorithms for setting CCA weights based on such factors may include solutions to the so-called "multi-armed bandit problem." Examples of multi-armed bandit solution algorithms may include the "UCB1" algorithm originally described by Auer, Cesa-Bianchi, and Fischer in their 2002 paper, "Finite-time Analysis of the Multiarmed Bandit Problem" published in Machine Learning, issue 47, pp. 235-256 (http://homes.di.unimi.it/~cesabian/Pubblicazioni/ml-02.pdf). Another example includes the "EXP3" algorithm originally described in 2001 by Auer, Cesa-Bianchi, Freund, and Schapire in their paper, "The Non-stochastic Multi-armed Bandit Problem." (http://cseweb.ucsd.edu/~yfreund/papers/bandits.pdf). Other algorithms designed to address multi-armed bandit problems may also be used.

Serving CCAs to Users

Typical network communications protocols involve sending a request from a client device to a server. The request typically contains at least enough information to allow the server to adequately respond. Requests from user client devices may be made and replied to via HTTP (Hypertext Transfer Protocol), WAP (Wireless Application Protocol), or any other suitable protocol. Presentations conforming to the CCAs may be served using HTTP, WAP, or another protocol.

Information included with a request may include the requesting device's IP address, User Agent, Referrer, Accept-Language, etc. A request may also include data from a cookie, a local shared object, a so-called "flash cookie," or other data identifying a client device and/or a session identifier.

In some embodiments, the DCM system 210 may include a user recognition engine (URE) 215 within or in communication with the dispatcher 214. The user recognition engine 215 may generally be configured to identify or determine information about a user and/or a client device making a request. In some embodiments, the user recognition engine 215 may uniquely identify a user or a user's client device using information contained in the request, such as a cookie identifier, HTTP header data, or other data. In other embodiments, the user recognition engine may determine other information about a user or a user's client device. For example, the user recognition engine 215 may determine a geographic location of the client device using the client device's IP address and a geolocation database. As another example, the user recognition engine 215 may identify the manufacturer and model of the client device from the HTTP User-Agent string. In some cases, a user recognition engine 215 may use device fingerprinting or any other techniques to identify a user and/or a client device based on multiple elements of information contained in a request or otherwise available.

In various embodiments, the DCM selector may be configured to select a campaign and one or more CCAs based on information 216 provided to the DCM selector by the dispatcher (or obtained directly from a user client device request). For example, in some embodiments, the DCM selector may select a campaign or one or more CCAs based on information contained in headers accompanying a client device request. In other embodiments, the DCM selector may select a campaign or one or more CCAs based on other user-identifying information obtained by the dispatcher 214 and/or the user recognition engine 215.

Based on information determined by the user recognition engine 215, the DCM system 210 may associate each requesting user with one or more demographic, psychographic, geographic or other groups. Such groups may be combined, divided, or otherwise treated as user cohort groups defining groups of users with a common set of characteristics.

In some embodiments, after associating a requesting user with a particular user cohort group, a user cohort group identifier may be communicated to the DCM selector 218, which may use the user cohort group as a basis for selecting a campaign configuration set.

In some embodiments, the client device request may contain an identifier requesting data associated with a particular campaign or campaign configuration set. In such embodiments, the campaign identifying data may be transmitted from the dispatcher to the DCM selector. In some embodiments, the DCM selector may select a campaign configuration set at random from a plurality of available configuration definition files meeting any requirements based on a requested campaign or user cohort data. In other embodiments, the DCM selector may select a campaign configuration set based on additional factors such as a time of day, a day of the week, a season, or other temporal factors.

The DCM selector 218 may then pass the selected campaign configuration set (or data identifying a location from which the configuration set may be retrieved) to the CCA selector 226. The CCA selector 226 may then select one of the CCAs contained within the campaign configuration set selected by the DCM selector 218.

The CCA selector 226 may select one of the available CCAs contained within the campaign configuration set based (at least in part) on the CCA weights retrieved from the CCA Weight data store 230. For example, the CCA selector 228 may, upon receiving a request from a user, generate a random number and choose a CCA proportionally to the CCA weights based on the generated random number. Subsequent user actions associated with each CCA may then be tracked to evaluate success of the CCA.

Tracking Success of CCAs

In various embodiments, a number of different success metrics may be used to evaluate the success of a particular impression corresponding to a selected CCA. In some embodiments, a success metric may be a conversion rate, defined as the proportion of users who reach the CCA presentation who also proceed to complete a desired transaction. In some embodiments, a success metric may be a "click-through rate" which may be defined as the number of "clicks" on a particular target link in a period of time divided by a total number of sessions that requested the CCA presentation during the same period of time.

In some embodiments, a success metric may be a currency-based metric. For example, a success metric may be a total revenue generated (e.g., through sales or ad revenue) from the CCA presentation in a period of time divided by a total number of sessions requesting the CCA presentation during the same period of time. Another example of a revenue-based success metric may be a total revenue generated from the CCA presentation in a period of time divided by a total number of "clicks" on a particular target link on the CCA presentation in the same period of time (e.g., a predetermined number of hours, one or more days, one or more weeks, one or more months, etc.).

CCA success metrics may include quantitative and/or qualitative measures of web traffic to or from one or more pages based on a CCA. CCA success metrics may also include quantitative and/or qualitative measures of spam visits to or spam clicks on a page based on a CCA. "Spam" visits or clicks may include requests driven by automated systems (or "bots") rather than by legitimate users. CCA success metrics may include quantitative or qualitative measures of users' perceptions of the relevance of a CCA page. User relevance may be measured based on actions of a user, such as how many clicks are made, how much time is spent on a page, whether the user makes a purchase, downloads a file, provides and email address, creates an account, or other actions. In other embodiments, any other suitable success metric may also be used.

In some embodiments, the DCM system 210 may conduct an analysis to identify CCAs that experience significantly greater success among users in a particular cohort than other user cohorts or than the overall population of users. In some embodiments, campaigns or CCAs that demonstrate high success with a particular user cohort may be grouped together into campaigns or campaign configuration sets specifically associated with the identified user cohort. Subsequent requests from users within the user cohort may then be directed specifically to the campaign and/or CCAs most likely to be successful for the identified cohort.

In some embodiments, a user cohort may be initially defined exclusively by similarities in CCA test outcomes. In other words, even if no recognizable demographic, geographic, or psychographic pattern is initially visible, a group of users who prefer a particular CCA at a higher rate than the general population may be defined as a cohort. Identifying information associated with users within such a cohort may then be further analyzed to discover any recognizable patterns that may be useful in identifying additional users that may fit within the cohort.

Boosting CCA Weights

In some embodiments, selected CCAs may have their weights increased or "boosted" in order to increase the proportion of users who will see that CCA relative to other CCAs in the same campaign configuration set. In some embodiments, the DCM Refresher 250 may select CCAs for weight boosting (e.g., block 108 in FIG. 1) based on an analysis of factors such as the CCA's current weight, past success metrics, and statistical measures of past success metrics. In various embodiments, CCA weight boosting may be performed by other logical components or at different points during the testing process.

In one example, the one, two, or three (or more) CCAs with the smallest numeric value weights within a campaign configuration set may be selected for weight boosting. In another example, the one, two, three, or more CCAs with the smallest number of sessions (i.e., the ones that have been displayed to users the least often during a test or during a period of time) may be selected for weight boosting. In another example, CCAs selected for weight boosting may include the one, two, three, or more CCAs with the widest confidence intervals compared to others within the same campaign configuration set in ranked order from widest to narrowest confidence intervals. In another example, a selected CCA may have a wide confidence interval if the confidence interval for the selected CCA is more than 10% (or 20%, 25%, 30%, 40% or 50% or more) wider than the average confidence interval for all other CCAs in the same campaign using the same confidence level.

In some embodiments, selection of one or more CCAs for boosting may be random, or random from within a subgroup of CCAs. For example, all CCAs within a campaign configuration set may be separated into groups as being above or below a threshold value of the success metric or a statistical measure of the success metric. A CCA may then be randomly selected for boosting from among the CCAs within the group below the threshold.

Once a CCA has been selected for weight boosting, the weight may be boosted by generating a random number and substituting the weight with the random number or performing a mathematical operation to increase the value of the weight based on the random number. In some cases, CCA weights may be boosted by a pre-determined fixed quantity. In some embodiments, after boosting the weight of one or more CCAs within a campaign configuration set, some or all of the weights within a campaign configuration set may be re-normalized to a desired scale, such as a scale from zero to one, a scale from one to 100, or any other scale.

Computing and Processing Devices

Figure 3:
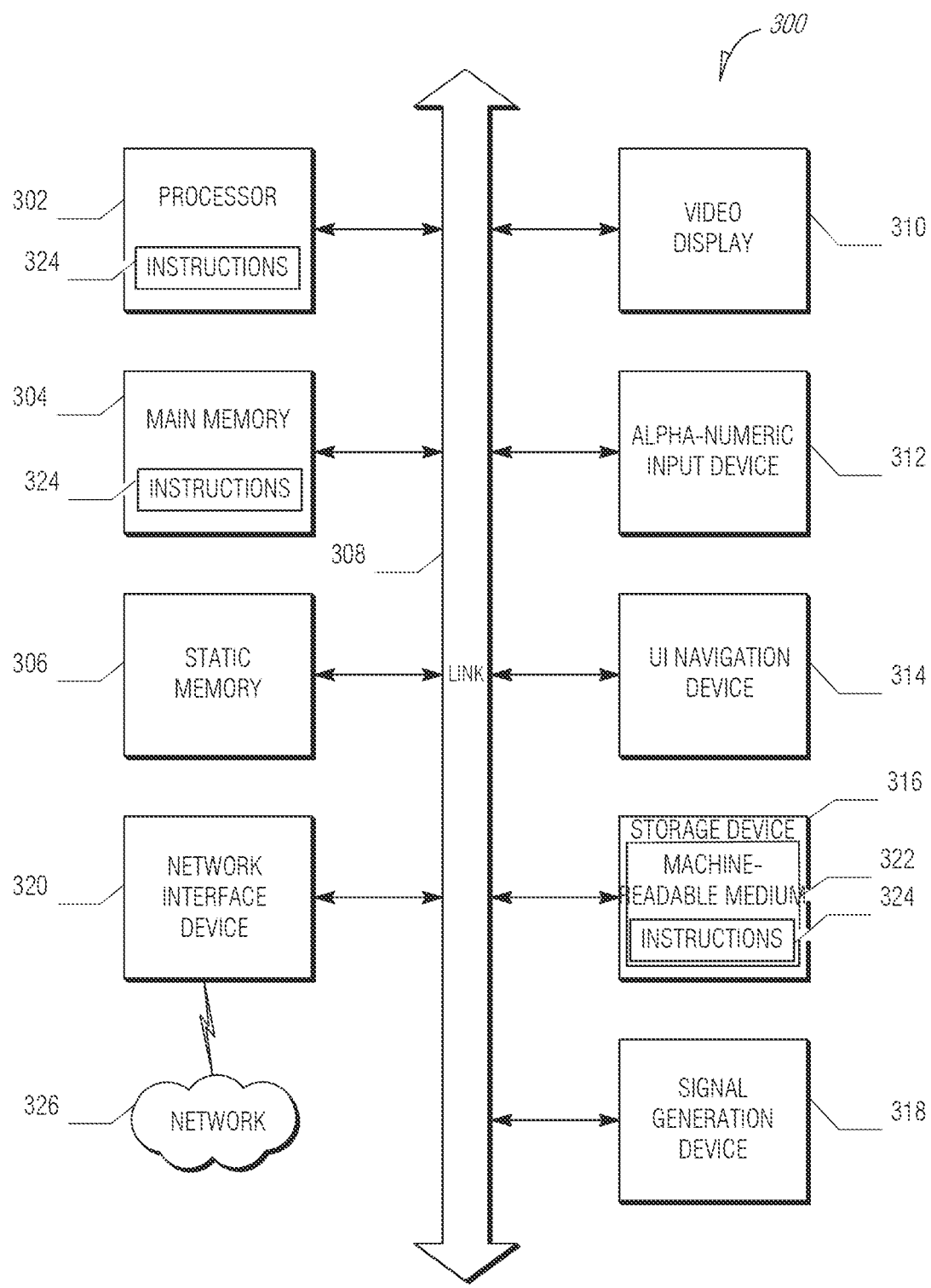
FIG. 3 is a block diagram of machine in the example form of a computer system within which a set instructions, for causing the machine to perform any one or more of the methodologies discussed herein, may be executed

FIG. 3 is a block diagram illustrating a machine 300 in the example form of a computer system 300, within which one or more sets or sequences of instructions may be executed to cause the machine 300 to perform any one of the processes or methods described herein, according to various example embodiments. In some embodiments, a machine 300 such as that shown in FIG. 3 may operate as a standalone device or may be connected (e.g., networked) to other machines. In a networked deployment, a machine 300 may operate in the capacity of either a server or a client machine in server-client network environments, or a machine may act as a peer machine in peer-to-peer (or distributed) network environments.

The machine 300 may be a personal computer (PC), a laptop computer, a desktop computer, a server computer, a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. For example, in some cases, a single physical machine may be configured to operate as multiple virtual machines by separately allocating resources of a physical machine to multiple separate processes.

The example computer system 300 may include at least one processor 302 (e.g., a central processing unit (CPU), a graphics processing unit (GPU) or both, processor cores, compute nodes, etc.), a main memory 304 and a static memory 306, which may communicate with each other via a link 308 (e.g., bus). The computer system 300 may further include a video display unit 310, an alphanumeric input device 312 (e.g., a keyboard, touch screen, etc.), and a user interface (UI) navigation device 314 (e.g., a mouse, touch pad, touch screen, etc.). In one embodiment, the video display unit 310, input device 312 and UI navigation device 314 may be incorporated into a touch screen display.

The computer system 300 may additionally include one or more storage devices 316 (e.g., a drive unit), a signal generation device 318 (e.g., a speaker), a network interface device 320, and one or more sensors (not shown), such as a global positioning system (GPS) sensor, compass, accelerometer, or other sensor.

The storage device 316 (or devices) may include a machine-readable medium 322 on which may be stored one or more sets of data structures and instructions 324 (e.g., software) embodying or utilized by any one or more of the processes, modules, methodologies or functions described herein. The instructions 324 may also reside, completely or at least partially, within the main memory 304, static memory 306, and/or within the processor 302 during execution thereof by the computer system 300, with the main memory 304, static memory 306, and the processor 302 also constituting machine-readable media. In various embodiments, instructions for separate modules or processes may be stored in storage regions on the one or more storage devices. Additionally, data stores, in the form of databases or other collections of data may also be stored in storage regions on the one or more storage devices. Storage regions may be physically contiguous or non-contiguous on the one or more storage devices, may be any size as needed, and may use any file management system, database management system, or data management system as desired.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of well-known transfer protocols (e.g., HTTP, WAP,). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any tangible or intangible medium that is capable of storing, encoding, or carrying instructions for execution by the machine, and includes digital or analog communications signals or other medium to facilitate communication of such software.

Any of the devices, modules, data stores, servers, or other computing systems described in the various embodiments herein may include some or all elements of the machine 300 illustrated in FIG. 3 and described herein. For example, any or all of the elements described herein with reference to FIG. 2 may be physically implemented in one or more machines 300. Such elements may include the user client devices 202, the managing user client devices 206, the dispatcher module 214, the user recognition engine 215, the DCM selector module 218, the campaign configuration data store 220, the CCA selector module 226, the CCA weight data store 230, the DCM refresher module 250, the campaign controller module 234, or the success metric data store 244.

Certain Terminology

The present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semicylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may indicate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may indicate, the term "generally parallel" can refer to something that departs from exactly parallel by less than or equal to 20 degrees and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Although the dynamic campaign testing systems and methods have been disclosed in the context of certain preferred embodiments and examples, it will be understood by those skilled in the art that this disclosure extends beyond the specifically disclosed embodiments to other alternative embodiments and/or uses of the dynamic campaign testing systems and methods and obvious modifications and equivalents thereof. For example, various aspects of the dynamic campaign testing systems and methods may also be used in automated testing in fields other than advertising.

Various modifications to the above embodiments will be readily apparent to those skilled in the art, and the principles described herein may be applied to other embodiments without departing from the spirit or scope of this disclosure. Thus, it is intended that the scope of this disclosure should not be limited by the particular disclosed embodiments described. Various features and aspects of the disclosed embodiments can be combined with or substituted for one another in order to form varying modes of the dynamic campaign testing systems and methods. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination. Further, the claims may be drafted to exclude any disclosed element. As such, the foregoing sentence is intended to serve as antecedent basis for use of such exclusive terminology as "solely," "only" and the like in connection with the recitation of claim elements, or use of a "negative" limitation.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of dynamic campaign testing systems and methods have been disclosed. Although the dynamic campaign testing systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

What is claimed is:

1. A method comprising:
receiving, over a network connection and at a computing device, user requests originating from respective client devices, for a content element;
identifying, by the computing device, configuration alternatives for the content element;
in response to each of the user requests:
selecting one of the configuration alternatives based on initial weights of the configuration alternatives;
configuring, by the computing device, an alternative-configured impression of the requested content element according to the selecting; and
presenting the alternative-configured impression to the respective user request, wherein presenting includes transmitting the alternative-configured impression of the content element to a respective originating client device;
updating, by the computing device, each respective initial weight of the configuration alternatives to a respective second weight based on subsequent requests for the content element corresponding to the presented alternative-configured impression;
automatically selecting, by the computing device and after the updating, a configuration alternative, the configuration alternative having a second weight that is below a threshold; and
based on the automatically selecting, increasing, by the computing device the second weight of the selected configuration alternative to a third weight by adding a random amount to the second weight.

2. The method of claim 1, further comprising:
calculating a success metric value for each configuration alternative based on the subsequent requests from users to whom each corresponding alternative-configured impression is presented; and
wherein the updating is in proportion to the success metric each configuration alternative.

3. The method of claim 2, wherein the updating is further based on a member of the group comprising: statistical significance intervals of the success metric, a number of trials in which each configuration alternative has been tested, a total number of trials in which all configuration alternatives in a campaign have been tested, a frequency of configuration alternative testing trials, timing history of configuration alternative testing trials, dates configuration alternative test impressions, and a geographical location of users viewing a tested configuration alternative.

4. The method of claim 1, wherein the automatic selecting comprises selecting a configuration alternative with a statistical confidence interval wider than a threshold confidence interval.

5. The method of claim 1, wherein the automatic selecting comprises selecting a configuration alternative with a number of impressions during a past period of time below a threshold number of impressions.

6. The method of claim 1, wherein identifying the configuration alternatives comprises identifying information describing a user and selecting a plurality of configuration alternatives based on the information describing the user.

7. The method of claim 6, wherein identifying information describing the user comprises identifying a user cohort of which the user is a member.

8. A non-transitory computer-readable medium comprising instructions, which when executed by at least one processor, configure the processor to perform operations comprising:
receiving, over a network connection and at a computing device, user requests originating from respective client devices, for a content element;
identifying, by the computing device, configuration alternatives for the content element;
in response to each of the user requests:
selecting one of the configuration alternatives based on initial weights of the configuration alternatives;
configuring, by the computing device, an alternative-configured impression of the requested content element according to the selecting; and
presenting the alternative-configured impression to the respective user request, wherein presenting includes transmitting the alternative-configured impression of the content element to a respective originating client device;
updating, by the computing device, each respective initial weight of the configuration alternatives to a respective second weight based on subsequent requests for the content element corresponding to the presented alternative-configured impression;
automatically selecting, by the computing device and after the updating, a configuration alternative, the configuration alternative having a second weight that is below a threshold; and
based on the automatically selecting, increasing, by the computing device the second weight of the selected configuration alternative to a third weight by adding a random amount to the second weight.

9. The non-transitory computer-readable medium of claim 8, the operations further comprising:
calculating a success metric value for each configuration alternative based on the subsequent requests from users to whom each corresponding alternative-configured impression is presented; and
wherein the updating is in proportion to the success metric each configuration alternative.

10. The non-transitory computer-readable medium of claim 9, wherein the updating is further based on a member of the group comprising: statistical significance intervals of the success metric, a number of trials in which each configuration alternative has been tested, a total number of trials in which all configuration alternatives in a campaign have been tested, a frequency of configuration alternative testing trials, timing history of configuration alternative testing trials, dates configuration alternative test impressions, and a geographical location of users viewing a tested configuration alternative.

11. The non-transitory computer-readable medium of claim 8, wherein the automatic selecting comprises selecting a configuration alternative with a statistical confidence interval wider than a threshold confidence interval.

12. The non-transitory computer-readable medium of claim 8, wherein the automatic selecting comprises selecting a configuration alternative with a number of impressions during a past period of time below a threshold number of impressions.

13. The non-transitory computer-readable medium of claim 8, wherein identifying the configuration alternatives comprises identifying information describing a user and selecting a plurality of configuration alternatives based on the information describing the user.

14. The non-transitory computer-readable medium of claim 13, wherein identifying information describing the user comprises identifying a user cohort of which the user is a member.

15. A system comprising:
at least one processor;
at least one storage device comprising instructions, which when executed by the at least one processor, configure the at least one processor to perform operations comprising:
receiving, over a network connection, user requests originating from respective client devices, for a content element;
identifying configuration alternatives for the content element;
in response to each of the user requests:
selecting one of the configuration alternatives based on initial weights of the configuration alternatives;
configuring an alternative-configured impression of the requested content element according to the selecting; and
presenting the alternative-configured impression to the respective user request, wherein presenting includes transmitting the alternative-configured impression of the content element to a respective originating client device;
updating each respective initial weight of the configuration alternatives to a respective second weight based on subsequent requests for the content element corresponding to the presented alternative-configured impression;
automatically selecting, after the updating, a configuration alternative, the configuration alternative having a second weight that is below a threshold; and
based on the automatically selecting, increasing, the second weight of the selected configuration alternative to a third weight by adding a random amount to the second weight.

16. The system of claim 15, the operations further comprising:
calculating a success metric value for each configuration alternative based on the subsequent requests from users to whom each corresponding alternative-configured impression is presented; and
wherein the updating is in proportion to the success metric each configuration alternative.

17. The system of claim 16, wherein the updating is further based on a member of the group comprising: statistical significance intervals of the success metric, a number of trials in which each configuration alternative has been tested, a total number of trials in which all configuration alternatives in a campaign have been tested, a frequency of configuration alternative testing trials, timing history of configuration alternative testing trials, dates configuration alternative test impressions, and a geographical location of users viewing a tested configuration alternative.

18. The system of claim 15, wherein the automatic selecting comprises selecting a configuration alternative with a statistical confidence interval wider than a threshold confidence interval.

19. The system of claim 15, wherein the automatic selecting comprises selecting a configuration alternative with a number of impressions during a past period of time below a threshold number of impressions.

20. The system of claim 15, wherein identifying the configuration alternatives comprises identifying information describing a user and selecting a plurality of configuration alternatives based on the information describing the user.

21. The system of claim 20, wherein identifying information describing the user comprises identifying a user cohort of which the user is a member.

\* \* \* \* \*